Figure 1:
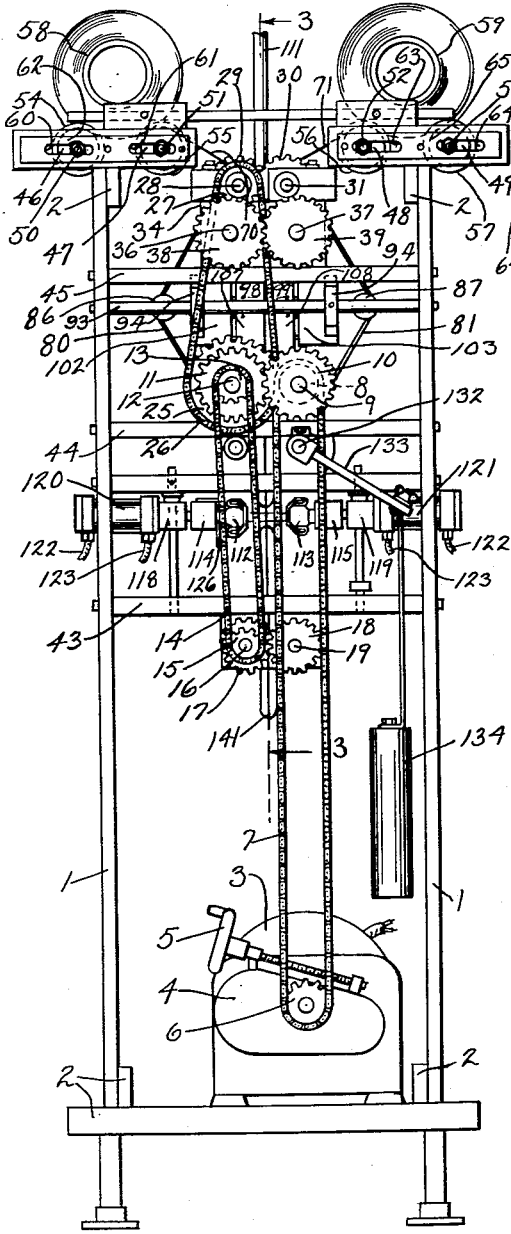

Dec. 5, 1961 G. J. BURSAK 3,011,934
CONTINUOUS BELT FEED, HEAT SEALING APPARATUS
Filed April 2, 1958 6 Sheets-Sheet 1

INVENTOR
GEORGE J. BURSAK

BY

ATTORNEYS

Dec. 5, 1961 G. J. BURSAK 3,011,934
CONTINUOUS BELT FEED, HEAT SEALING APPARATUS
Filed April 2, 1958 6 Sheets-Sheet 2

INVENTOR
GEORGE J. BURSAK
BY Quarles, Fox, Seidel
Bateman & Hoar
ATTORNEYS

Dec. 5, 1961

G. J. BURSAK 3,011,934

CONTINUOUS BELT FEED, HEAT SEALING APPARATUS

Filed April 2, 1958

6 Sheets-Sheet 3

INVENTOR
GEORGE J. BURSAK

BY Quarles, Fox, Seidel,
Bateman & Hoar

ATTORNEYS

Dec. 5, 1961   G. J. BURSAK   3,011,934
CONTINUOUS BELT FEED, HEAT SEALING APPARATUS
Filed April 2, 1958   6 Sheets-Sheet 4
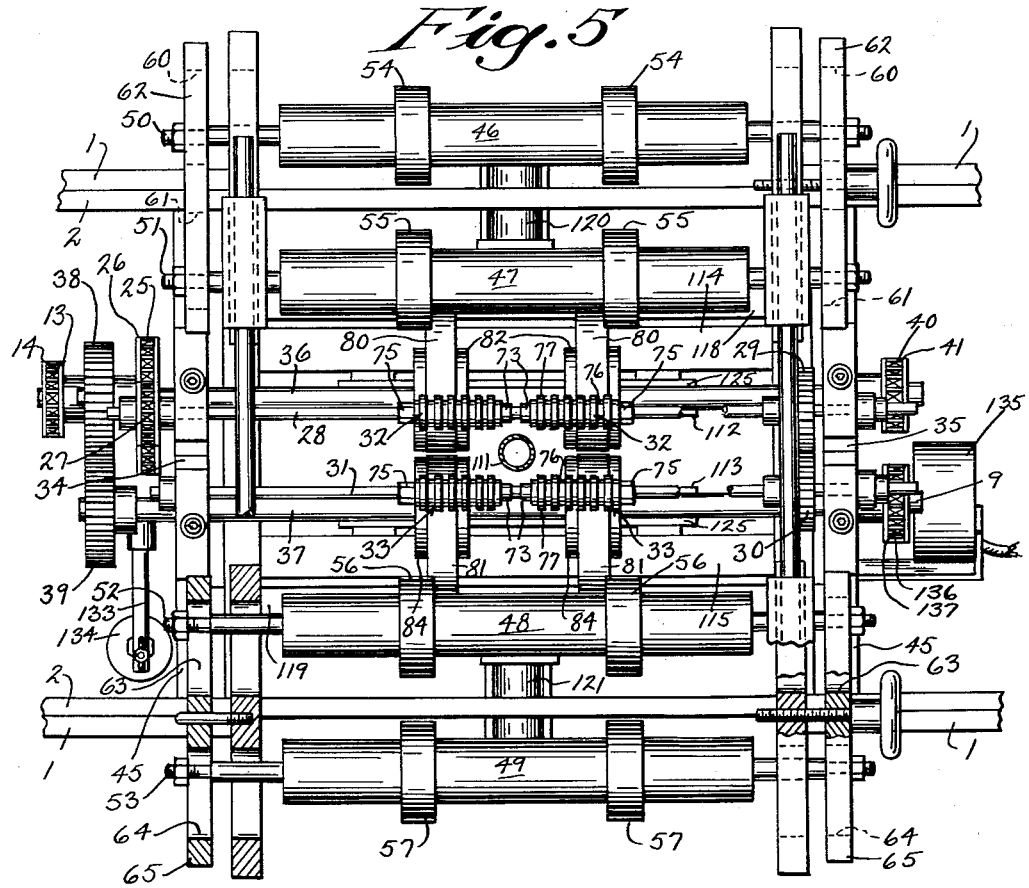
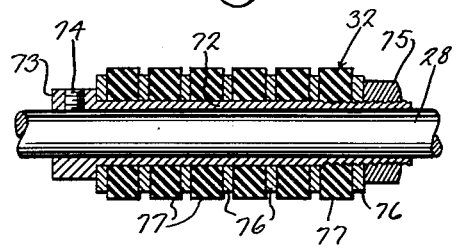
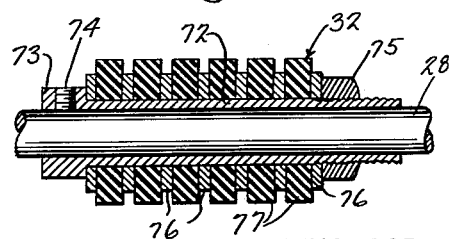
INVENTOR
GEORGE J. BURSAK
BY Quarles, Fox, Seidel,
Bateman & Hoar
ATTORNEYS Dec. 5, 1961 G. J. BURSAK 3,011,934
CONTINUOUS BELT FEED, HEAT SEALING APPARATUS
Filed April 2, 1958 6 Sheets-Sheet 5

INVENTOR
GEORGE J. BURSAK

BY Quarles, Fix, Seidel,
Bateman & Hoar

ATTORNEYS

Dec. 5, 1961 G. J. BURSAK 3,011,934
CONTINUOUS BELT FEED, HEAT SEALING APPARATUS
Filed April 2, 1958 6 Sheets-Sheet 6

INVENTOR
GEORGE J. BURSAK

BY Quarles, Fox, Seidel,
Bateman & Wood

ATTORNEYS

United States Patent Office 3,011,934
Patented Dec. 5, 1961

3,011,934
CONTINUOUS BELT FEED, HEAT SEALING APPARATUS
George J. Bursak, 5601 W. Auer Ave., Milwaukee, Wis.
Filed Apr. 2, 1958, Ser. No. 725,902
12 Claims. (Cl. 156—367)

The present invention relates to improved packaging and bag making apparatus, and in particular, to an apparatus for forming flexible convenience packaging by continuous belt feed from heat sealable, sheet material; concurrent filling, where desired, of the formed package and finally, sealing and separating the finished packages.

The preferred embodiment provides an apparatus which is compact and which contains operating components positioned for ready access for adjustment, maintenance and loading of material, including component parts of relatively light weight, and being particularly adaptable for operation by female personnel.

Among the objects of the present invention is the provision of a packaging apparatus particularly adapted for heat sealing flexible packaging materials including laminates and entire packages of the material, and wherein the material to be sealed is subject to stretching, warping and settling during storage prior to formation of the package, and further, which apparatus is particularly adaptable for webs of heat sealing delicate films, thereby eliminating the possibility of burning and tendency of these films to stick or adhere to the surfaces of heat and pressure applying members.

Another object of the present invention is to provide a packaging machine including component parts which are adjustable dimensionally relative to one another, without requiring removal of the part or any component thereof, thereby permitting adjustment for package seal spacing both in width and length by simple axial spacing of rotating members and/or varying a timing cycle controlling application of particular sealing members.

It is a further object of the present invention to provide a revoluble belt means for conveying a web of sealable material between sealing members, wherein said belt is of insulating material characterized by its nonadherence to the sealable material.

It is still another object of the present invention to provide radially expansible and contractible guide rollers for a packaging apparatus arranged for receiving and leading opposed webs of sealable material into facing relationship preparatory to sealing, and wherein said material is subject to settling on feed spools during storage becoming uneven in thickness, and which guide rollers may be adjusted in diameter to compensate for variations in said thickness to provide relative alignment of said opposed webs.

It is still a further object of the invention to provide a heat sealing device for heat opposed sealable films including means for providing a predetermined and variable dwell period during sealing operation to insure an adequate and secure sealing engagement of marginal portions of said films.

It is still another object of this invention to provide a continuously operated package or bag making machine wherein the package length is adjustable throughout an infinite range by simple adjustment of the period of a timing cycle operatively associated with coacting transverse end sealing members.

The foregoing and other objects and advantages of the invention will appear in the description to follow. In the description, reference is made to the accompanying drawings, which form a part hereof, and in which there is shown by way of illustration, and not of limitation, a specific form in which the invention may be embodied.

Figure 2:
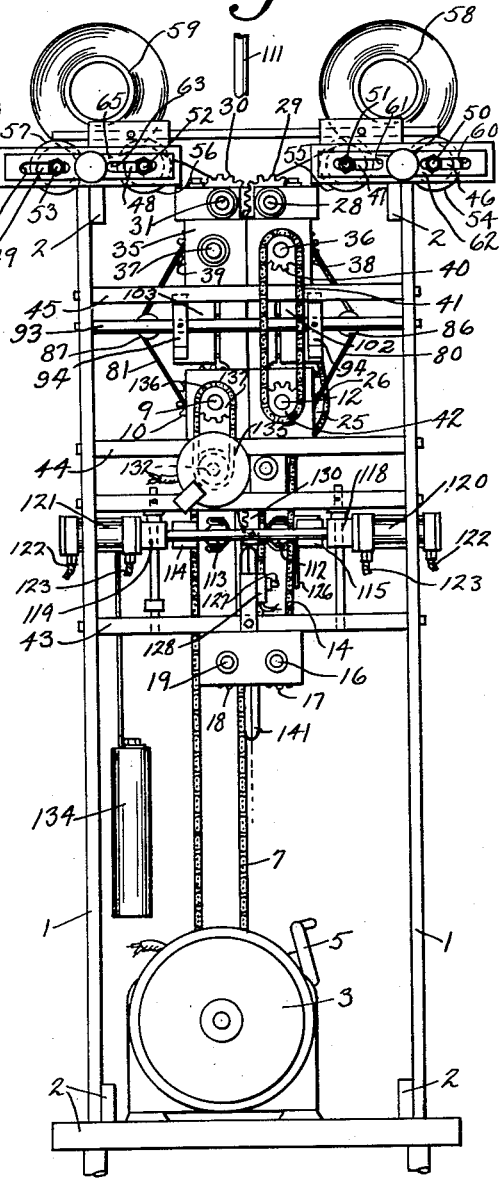
Figure 3:
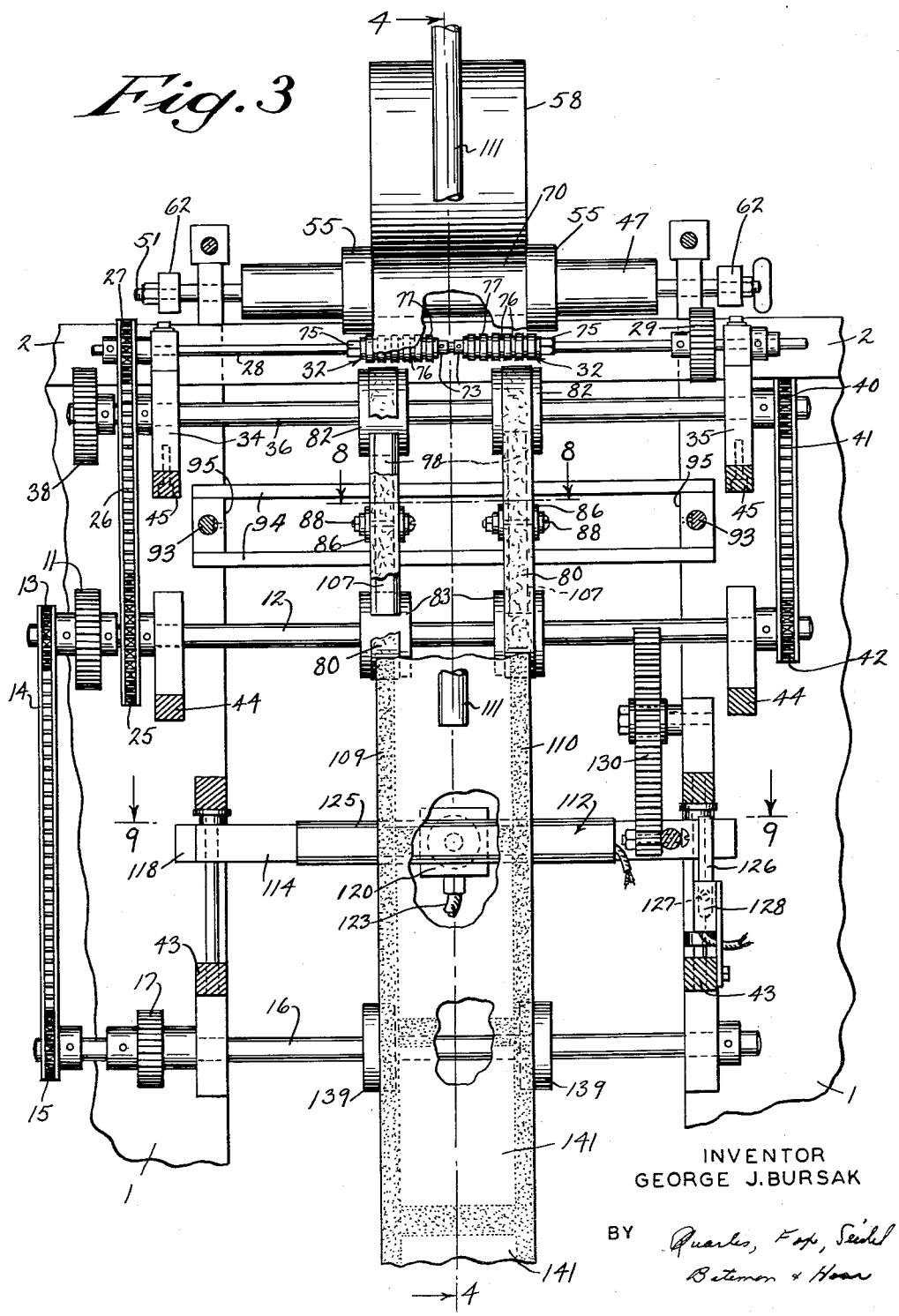
Figure 4:
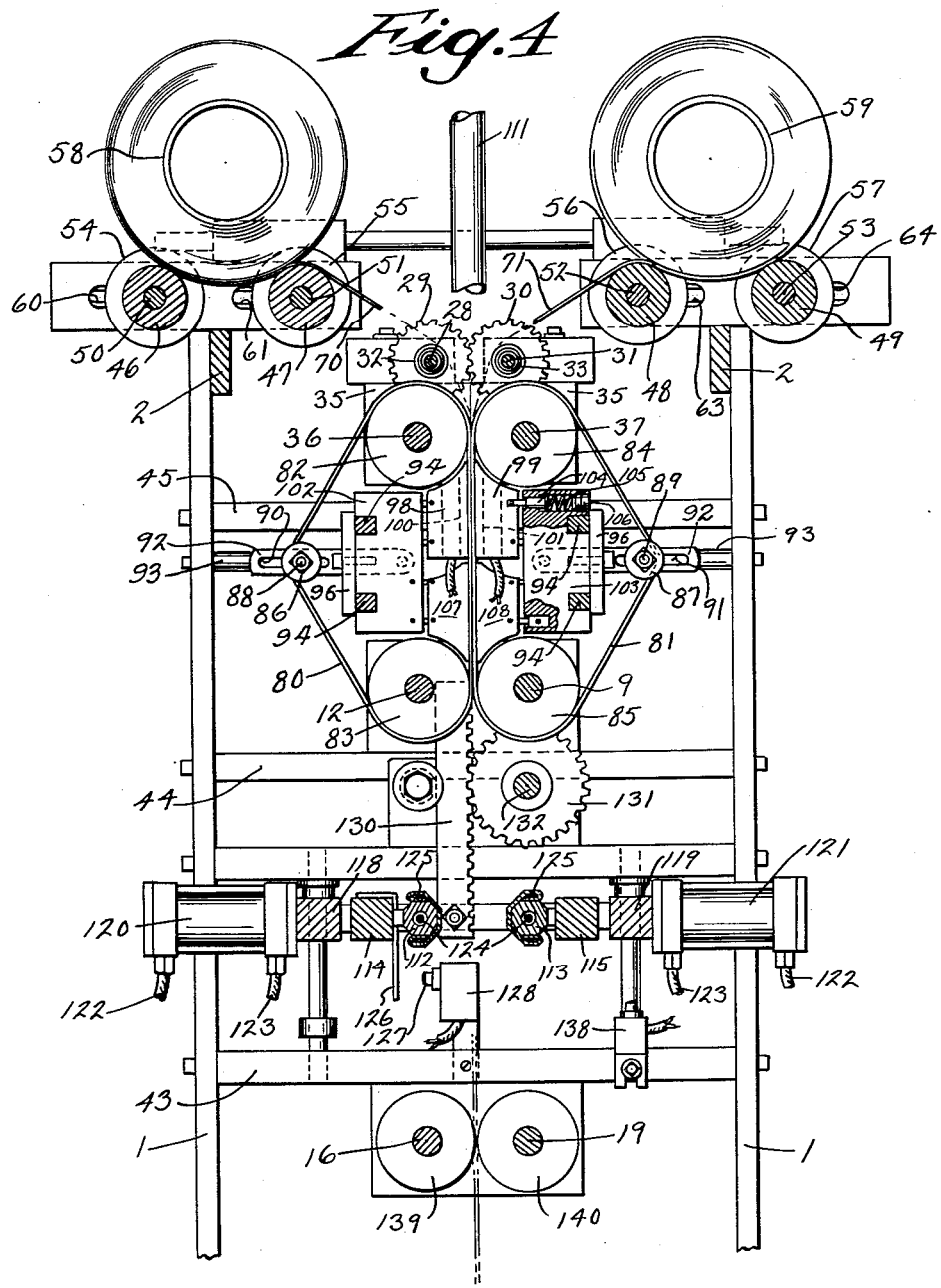
Figure 8:
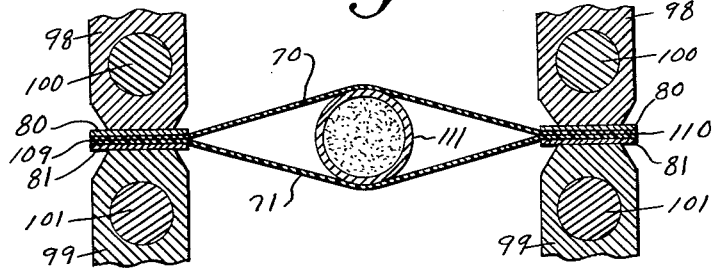
Figure 9:
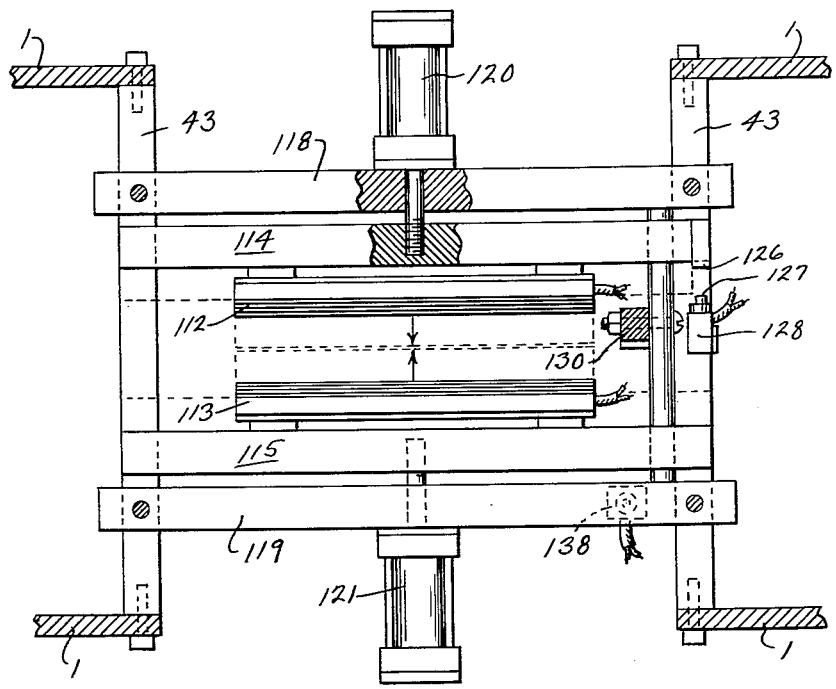
Figure 10:
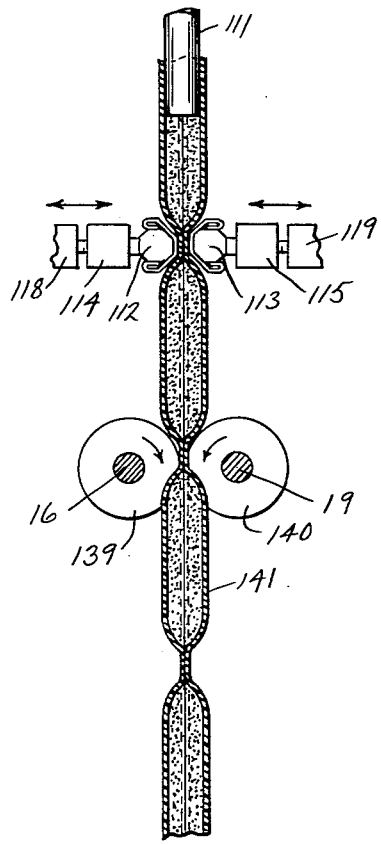
Figure 11:
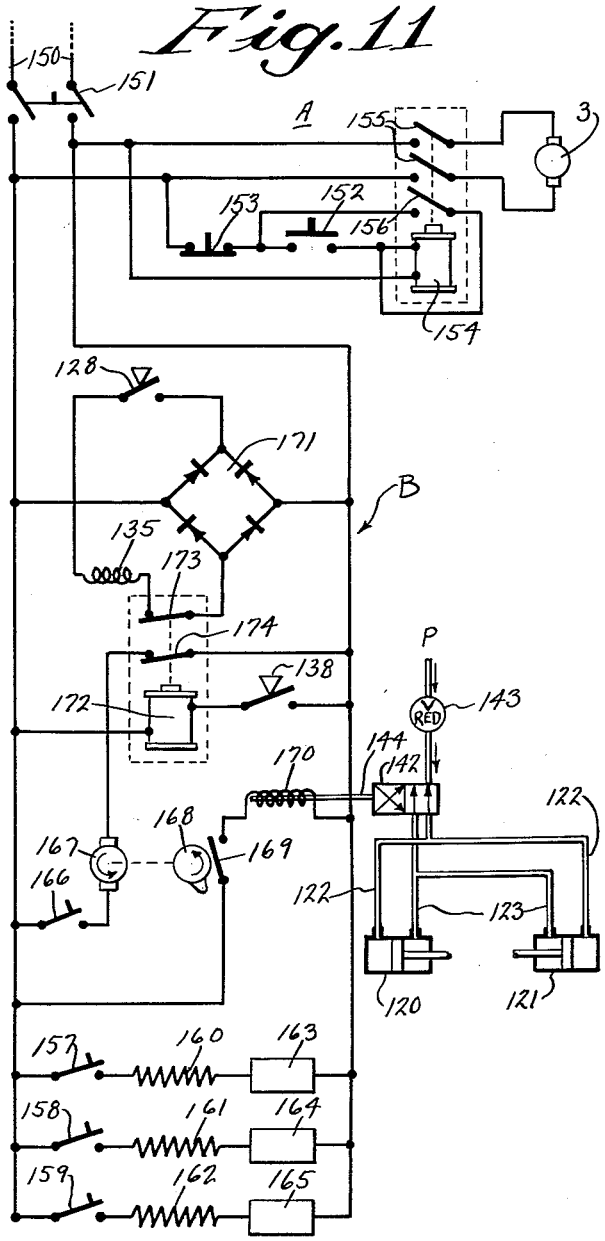

In the drawings:
FIG. 1 is a side elevational view with the protective cover or casing removed to illustrate the operating components of package forming and filling apparatus embodying the present invention;
FIG. 2 is a side elevational view of the machine of FIG. 1 taken from the opposite side thereof;
FIG. 3 is a front view in elevation and in section, with parts broken away, of the apparatus viewed through the plane 3—3 indicated in FIG. 1;
FIG. 4 is a side view in elevation, and in section, with parts broken away, of a portion of the apparatus viewed through the plane 4—4 indicated in FIG. 3;
FIG. 5 is a view in top plan and section, with the feed spools removed;
FIGS. 6 and 7 are fragmentary sectional views of an improved guide roll, showing the roll components in contracted and expanded relationship, respectively;
FIG. 8 is a fragmentary view in section viewed through the plane 8—8 indicated in FIG. 3;
FIG. 9 is a fragmentary sectional view of a portion of the apparatus indicating the arrangement of transversely operated heating bars and viewed through the plane 9—9 indicated in FIG. 3;
FIG. 10 is a fragmentary view in elevation and in section indicating the method of sealing the ends of individual packages and concurrently filling the sealed member; and
FIG. 11 is a diagrammatic view of the electrical circuit and cooperating pneumatic circuit controlling the operation and sequence of operation of the various components forming a part of the apparatus.

It will be understood that the terms "packaging machine" or "packaging apparatus" as used throughout the ensuing description and appended claims is to be considered in its broader definition to include apparatus for making simple bags, open at one end for later packaging and sealing, where desired. Simple selection of the position of the cutoff knife or knives relative to the end seal means may be used to slice the sealed member with an open end rather than closed without departing from the province of the present invention.

Referring now to the drawings, a supporting frame is provided, and comprises laterally spaced, vertical support legs 1 which are attached at their base to horizontal support members 2, providing a platform for a drive motor 3. The motor 3 preferably includes a manually operated variable speed drive mechanism 4 having a rotatable speed selecting handle member 5. It will be apparent from the ensuing description that any of many speed control mechanisms (not shown) may be substituted for the mechanism 4, but the device is conventionally supplied as a part of the motor and is particularly suitable for the operation of the apparatus. It will be apparent that the entire packaging apparatus may be closed with side panels (not shown), which extend for a suitable length between each of the vertical legs 1, and have been removed for purposes of more clearly illustrating and describing the components and operation of the apparatus.

An axially supported drive sprocket 6 is driven from the variable speed mechanism 4 (see FIG. 1) and meshes with an elongated drive sprocket chain 7 extending upwardly as viewed in FIG. 1, to mesh with the driven sprocket 8 mounted on a rotatable shaft 9, which further supports a laterally projecting gear 10, and which is suspended between opposite sides of the vertical legs 1. The gear 10 meshes with a similar, oppositely positioned gear 11 supported on a through shaft 12 to provide rotatable motion to the shaft 12 along with members attached thereto. For instance, a sprocket 13, of relatively reduced diameter, is driven by the gear 11 and shaft 12 as a means of driving the sprocket chain 14 (see also FIGS. 3 and 5) rotatably engaging the sprocket 15 supported on a through shaft 16. The rotatable shaft 16 further rotatably supports the gear 17 meshing with a driven gear 18 supoprted by the rotatable through shaft 19.

With reference to FIG. 1, the rotatable shaft 12 also includes a sprocket 25 meshing with sprocket chain 26 extending upwardly to drive sprocket 27 mounted upon shaft 28. The shaft 28 extends to the opposite side of the apparatus (see FIG. 5) and supports at its opposite end a gear 29 (see also FIG. 2) in mesh with a gear 30 mounted on the shaft 31. Both shafts 28 and 31 respectively support radially expansible and contractible guide rollers 32a, 32b, 33a and 33b, respectively, the purposes and details of which will be hereinafter described. The shafts 28 and 31 are each journaled at their respective ends in spaced apart supporting blocks 34 and 35, respectively. (See FIGS. 3 and 5.) Also journaled in the respective support blocks 34 and 35 are shafts 36 and 37. Shafts 36 and 37 also include meshing gears 38 and 39 (see FIG. 1) rotatable therewith and arranged to provide substantially identical speed of rotation between the respective shafts and opposed heat-pressure mechanisms, as will hereinafter be described. As seen in FIGS. 2 and 3, the shaft 36 also includes a sprocket 40 engageable with a sprocket chain 41, which in turn is driven by a drive sprocket 42 mounted on the rotatable shaft 12. It will be recalled that the shaft 12 is rotated by means of the machine gears 10 and 11, connected to the motor 3 by means of a sprocket chain 7 engaging the sprocket 8.

Referring to the support members of the apparatus, it will be apparent that the vertical legs 1 and vertically spaced cross bar members 43, 44 and 45, combine to provide a frame including at the top thereof axially suspended, web supporting rollers 46 and 47 in parallel spaced relationship with one another and with parallel spaced rollers 48 and 49 at the opposite side of the framework. Referring to FIGS. 3 and 5, it will be apparent that the rollers 46–49 are rotatably supported by stationary shafts 50, 51, 52 and 53 respectively, and include axially spaced, slidable guide collars 54, 55, 56 and 57, respectively. It will also be apparent that rollers 46 and 47 are arranged to rotatably support a web feed cylinder or spool 58 seated therebetween, and parallel therewith (see FIGS. 1 and 2), as are support rollers 48 and 49 arranged to support the feed spool 59. The spools 58 and 59 are also seated between the respective, axially adjustable, collar pairs 54 and 55, and 56 and 57, as a means of providing parallel alignment between opposed webs. Horizontal slots 60 and 61 are provided in spaced supporting blocks 62 for parallel spacing adjustment of the shafts 50 and 51, to take into account variations in web roll size, and to provide secure seating of the web spool during operation of the machine. Likewise, slots 63 and 64 are provided in the laterally spaced blocks 65 for the same purpose. If desired, each of the web spools 58 and 59 may be rotatably seated axially of an axle or supporting mandrel (not shown) without departing from the scope of the present invention.

The opposed webs 70 and 71 from respective spools 58 and 59, are fed over the respective rollers 47 and 48 (see FIG. 4) to the resilient guide rollers 32 and 33 positioned on the shafts 28 and 31, respectively. Attention is directed to FIGS. 6 and 7, wherein the radially expansible-contractible guide rollers are exemplified by the roller 32a mounted on shaft 28, and illustrated in detail. Thus, an elongated hollow cylindrical sleeve or support member 72 is provided with a bore coaxial with and slidable relative to the shaft 28 and terminating in a radially extending shoulder or flange portion 73. The member 72 includes a transverse tapped opening for receiving an Allen screw 74 arranged for securing the member 72 stationary relative to the shaft 28, and permitting adjustment axially of the shaft 28. The opposite end of the member 72 is threaded to receive the threaded nut 75. Seated between the shoulder portion 73 and the nut 75 are a series of metal washers 76 alternating in arrangement with expansible-contractible, resilient washers 77. Thus, it will be apparent that as the nut 75 is tightened on the threaded portion of the member 72, it will force the washers 76 and 77 towards one another in axially opposed directions to cause the resilient washers 77 to expand radially outwardly as shown in FIG. 7, to thus affect the outer diameter of the resilient composite guide roller 32.

It will also be apparent that each individual set of guide rollers 32a and 32b, and 33a and 33b are preferably mounted independently of one another on their respective shafts and may be axially spaced relative to one another by simple unscrewing and retightening of the Allen screw 74 for movement to the desired position. As stated above, axial movement of the nut 75 upon the threaded portion of the member 72 permits selected relative expansion or contraction of the guide roller outer diameter to compensate for web thickness or other variations affecting proper aligned movement of the web. Very often, in the case of humidity sensitive web materials, such as polyvinyl alcohol film, the spools of material, when stored, tend to settle toward one end which will provide an uneven roll or spool. Thus, the guide roller contacting the thicker diameter portion may be adjusted for relatively less diameter than that of the roller axially spaced therefrom. The adjustable rollers 32 and 33 have been particularly beneficial for utilizing and salvaging spools of sealable material which have become settled during storage.

The remaining components providing direct relationship with support and movement of the web will next be described in connection with the views of FIGS. 3 and 4.

After being positioned over the resilient guide rollers 32 and 33, respectively, the webs 70 and 71 are impinged in opposed relationship between spaced pairs of oppositely rotating conveyor belts 80 and 81. With reference to FIG. 3, in particular, the pair of belts 80 are rotatably supported at their upper end upon a pair of axially spaced, adjustable rotors 82, each of which are slyidably supported for concurrent rotation with the shaft 36, and which may be fastened relative to the shaft after being adjusted to desired axial spacing, by means of Allen screws (not shown) or other key means. The lower end of the pair of belts 80 is supported by rotors 83 secured to and rotatable with shaft 12 in like manner as the rotors 82, and are adjustable for desired axial spacing. It will be apparent that rotation of the sprocket chain 14 will be transmitted to the shaft 12, and from there to the shaft 36 by means of sprocket chain 41 to provide constant relative speed therebetween.

Likewise, the conveyor belt 81 is rotatably supported by and driven by the adjustable spaced apart rotor members 84 at the upper end thereof, and at the lower end by means of rotor 85. Rotor 84 is supported on shaft 37, whereas collar pairs 85 are supported in axially spaced relationship (see FIG. 5) on shaft 9.

Tension on the belts 80 and 81 may be adjusted by means of rotatable flanged idlers 86 and 87, rotatably supported by bolt and nut assemblies 88 and 89, respectively, which assemblies are seated in respective slots 90 and 91 cut into the elements 92 laterally extending from support members 102 and 103, respectively. The nut and bolt assemblies 88 and 89 may be adjusted and tightened at desired lateral positions with respect to the slots 90 and 91.

The present invention contemplates the use of an insulating material for the conveyor bands, or belts 80 and 81, for direct sealing contact with the opposed webs 70 and 71, rather than by conventional direct contact by means of metallic heated pressure bars which might deleteriously affect the delicate plastic films of certain package materials. Thus, an excellent material for the belts 80 and 81 is of woven fiber glass coated with a surface layer of Teflon (polytetrafluoroethylene). The Teflon surface is known for its non-adherence to many of the known plastic films, and is especially adaptable for use with polyvinyl alcohol, which heretofore has been impractical for use with conventional heat sealing, packaging machinery.

Oppositely disposed cross bars 93 are supported at their ends by the vertical legs 1. The cross bars 93 are for the purpose of supporting rails 94 disposed therebetween and at opposite sides of the webs 70 and 71. The rails may be adjustably positioned on the respective cross bars 93 by means of set screws 95 (see FIG. 4).

As viewed in FIGS. 3 and 4, the opposed webs 70 and 71, positioned between the axially spaced belts of the respective pairs 80 and 81 are then sandwiched between oppositely positioned pairs of heat blocks 98 and 99, respectively. Each block is tapered at its other end to approximate the contour of the respective rotors 82 and 84 to provide a means of positioning the blocks as close to the entrance of the material as possible for space economy. The heat blocks 98 and 99 are of conductive material, such as brass, and are preferably hollow to permit the positioning of electrical resistance units 100 and 101, respectively (see FIG. 8), or other heat means. The heat blocks 98 and 99 are laterally supported from stationary support members 102 and 103, respectively. The stationary support members 102 and 103 are notched for sliding engagement with the respective rails 94 (see FIG. 4), and are held in adjustable, relative spaced relationship with other support members engaging the same rail by means of a clamping plate assembly 96 bolted thereto. Thus, it will be apparent that as the rotor pairs 82, 83 and 84, 85 and their respective belts 80, 81 are shifted on the respective shafts 36 and 12, the heater block support members 102 and 103 may also be shifted on the rails 94 to be aligned therewith. The stationary support members 102 and 103 are each provided with vertically spaced chambers (see support 103 of FIG. 4) arranged to receive a laterally projecting, slidable, support pin 104 arranged to supportingly engage the respective heat blocks 98 and 99 at the projecting terminus thereof. A biasing compression spring 105 is seated in the chamber and held in place by an Allen screw 106. This arrangement provides a convenient means of establishing constant pressure in opposite directions between and towards each of the heated blocks 98 and 99.

Positioned immediately below the heated blocks 98 and 99 are heat conducting pressure blocks 107 and 108, arranged in similar manner as the heated blocks to press in opposite directions towards one another and towards the sandwich comprising the opposed webs 70 and 71 and conveyor belts 80 and 81, respectively. Thus, continual rotation of the belts 80 and 81 convey the webs 70 and 71 past the opposed respective heated and cooling blocks for applying laterally spaced longitudinal seals at the edges of 109 and 110 of the opposed webs 70 and 71 (see FIG. 3).

It is to be noted that a filler tube 111 (see also FIGS. 5 and 8) extends downwardly between the opposed webs 70 and 71 to provide a means of concurrently filling a package as the package has been sealed. The filler tube 111 terminates at its upper end in a conventional hopper (not shown) which may be removably attached to the apparatus for temporarily storing and conveying material to be packaged by the apparatus of the present invention.

Thus, it is desirable to provide the lower terminus of the filler tube 111 in the proximity of the position where a cross seal is to be applied to the package in order to simultaneously fill the package immediately after the cross seal has been applied thereto.

It is one aspect of the present invention to provide a novel means of cross sealing a flexible convenience package, which means also controls the package length without requiring removal of any of the operating components, mechanical adjustment of the components, or attachment of auxiliary devices, such as may be found in conventional packaging apparatus. The spacial relationship of the cross seal is conveniently controlled by a simple timing mechanism, which in turn establishes a timing cycle for a solenoid pressure control device.

The relationship of the components comprising the cross bar sealing means may be viewed in FIGS. 4 and 5, and especially with relation to the other components of the present apparatus. Opposed cross seal bars 112 and 113, respectively, are each supported in cantilever from opposed laterally movable support members 114 and 115. The members 114 and 115 are slidably supported at their ends by means of the opposed stationary cross bar members 43. Parallel stationary supports 118 and 119 are secured to the members 116 and 117 in opposite spaced relationship, and each respectively have attached thereto, an actuator in the form of a pneumatic cylinder 120 and 121 including a reciprocating piston 144 (see FIG. 11) with ports at either side of the respective pistons communicating with conduits 122 and 123, respectively. Obviously, two or more spaced cylinders may be used for balanced movement if desired. The conduits are each connected with a conventional solenoid operated four-way valve 142 controlling air or other fluid pressure and egress or drain of fluid under pressure for alternative motion of the piston, as will hereinafter be described. It will be apparent that although pneumatic pressure is preferably used for convenience of operation, that any fluid pressure source, for instance a hydraulic oil pressure system may be equally substituted, and it will not depart from the invention to substitute solenoid operated actuators (not shown) for the cylinders 120 and 121 if so desired.

Each of the cross sealing bars 112 and 113 preferably contain a bore having an electrical resistance heating unit 124 contained therein. The cross bars are also preferably replaceably covered with an insulating surface material 125, such as fiber glass cloth coated with Teflon, as described above in connection with the belt pairs 80 and 81. The surface material is positioned substantially coextensive with the length of the bar, and extends at least the width of the finished package. Depending downwardly from the cross bar support member 114 is a switch actuator 126 mechanically releasably engageable with a button 127 of a stationary limit switch 128, for reasons hereinafter set forth. The entire cross sealing bar assembly is movable in opposed vertical directions by means of a vertically extending rack 130 engageable with a pinion 131. The pinion 131 is revolvably mounted upon a shaft 132, and with reference to FIG. 1, it will be apparent that the shaft 132 terminates at one end in a lever 133. At the free end of the lever, there is attached a dependent counterweight 134 which provides a means for resetting the rack and pinion after a cross seal has been made by the bars 112 and 113, respectively, and as will hereinafter be described. The shaft 132 is driven at its opposite end by means of a motor operated releasable clutch mechanism 135 (see FIG. 5). The clutch is conventional, and not illustrated in detail, and is electrically controlled from a normally open limit switch 128, its mechanical power being derived from the sprocket chain 136 (see FIG. 2) driven by the sprocket 137 mounted on rotatable shaft 9. Thus, the cross sealing bars 112 and 113 may be raised and lowered by the rack and pinion members 130 and 131, the rotation of the pinion 131 being controlled by means of the clutch mechanism 135 and counterweight 134 and limit switch 128, as hereinafter described. A lower limit switch 138 releasably engageable by the support 119 on the downward motion of the rack 130 serves to operate the solenoid valve 142, among other functions, for removal outwardly of the cross sealing bars 112 and 113 from the downwardly traveling sealed webs 70 and 71.

It will be apparent that the relative vertical mounting position of the switch 138, relative to FIG. 4, controls the vertical travel of the cross seal bars 112 and 113, thereby to establish the dwell period of the bars when in sealing relationship with the continuously moving webs 70 and 71. Thus, mounting of the switch 138 downwardly of the position shown on the bar 43, by means of an extended bracket or the like (not shown), will increase the travel of the cross bars 112 and 113, and accordingly provide an increased dwell time; conversely, raising the switch will decrease this period. Obviously, the length of the rack 130 should be chosen to be sufficient to accommodate the extended position of the switch 138 to prevent disengagement of the pinion 131 from the free end thereof.

Another limit switch (not specifically shown) may be provided for contact by the downwardly moving cross sealing bars 112 and 113 to actuate the filler mechanism (not shown), in order to immediately fill the package after the cross seal is made.

Oppositely rotating rotors 139 and 140 serve to withdraw the finished package 141, as shown in FIG. 10, from the apparatus to a point therebeyond for seperation of the package by conventional knife blades (not shown). Such knife blades may also be automatically controlled by means of the timed electrical circuit. The rotors 139 and 140 may also be positioned above the cross sealing bars 112 and 113 if desired. Also, relative positioning of knife blades may be used to provide a bag open at one end (not shown) if desired.

Referring now to the diagram of FIG. 11, taken in connection with the various heating members and mechanically movable members controlled thereby and illustrated in the preceding figures, a preferred electrical circuit is illustrated, wherein an A.C. power source 150 may be connected to the circuit by means of a manually operated master switch 151. The power source may preferably be fed to two independently operated circuits. Circuit A of which energizes the motor 3, supplying mechanical energy to the various mechanically operable components of the apparatus, whereas the circuit B includes the timing mechanism and resistant heater units which supply heat to the cross seal bars 112 and 113 and to the heated blocks 98 and 99.

The motor 3 is started by means of a conventional motor starter including normally open starter push button 152 and a normally closed motor stop button 153. On manual operation of the starter push button 152 to close its contacts, a starting solenoid 154 will be energized to close the line circuit contacts 155 and hold-in contact 156. The motor is permitted to continually operate without regard to the timer control circuit after the webs 70 and 71 are placed in proper feed position adjacent the conveyor bands 80 and 81. However, speed adjustment to the sprocket chain 7 is controlled by means of manual adjustment of the handle 5 of the variable speed control mechanism 4.

The heater switches 157, 158 and 159 are closed to provide heat to the members 98, 99, 112 and 113, respectively. Each heater is preferably thermostatically controlled at a preselected temperature. The heaters are indicated at 160, 161 and 162, with their respective thermostats 163, 164, and 165.

Contact 166 is closed to start a spring-controlled timer motor 167 in operation. The timer action is previously set to provide a specific timing period by means of adjustment of the cam 168 with relation to the switch 169, controlling the circuit to the solenoid indicated at 170. Thus, when the cam closes the switch 169, the solenoid 170 operates its magnetic plunger 144 operating the selective four-way valve 142 to permit closure or drawing together of the cross seal bars 112 and 113. The sealing pressure is pre-set by manual regulation of the pressure source P by means of the reducing valve 143. Referring to FIG. 9, it will be seen that, as the cross seal bars 112 and 113 move into sealing position, bar 112, carrying the actuator 126, presses the button 127 to close the normally open limit switch 128. Closure of the limit switch connects the circuit to the D.C. operated clutch motor 135 through a source of D.C. current supplied by the rectifier 171.

The clutch 135 drives the rack and pinion 130, 131, so that the cross seal bars 112 and 113, respectively, move downwardly with the webs 70, 71.

When the cross seal bars 112, 113 reach the limit of descent, the member 115 will engage the normally open limit switch 138, to close the said switch. On closure of the limit switch 138, the following occurs: (a) A relay coil 172 is excited; (b) both sets of relay contacts 173 and 174 are opened; (c) opening of the upper relay contact 173 opens the clutch circuit so that the counterweight 134 will be permitted to act upon the rack and pinion 130, 131; (d) opening of the lower contacts 174 opens the circuit to the timer motor 167 so that the spring (not shown) of the spring controlled timer motor will take over to reset the timer and also to open the timer contacts 169; (e) opening of the timer contacts 169 causes operation of the four-way control valve 142 by means of the solenoid 170 and its plunger 142 to actuate the withdrawal or release of the cross sealing bars 112 and 113, respectively, by means of the cylinder and pistons 120 and 121; (f) the cross sealing bars 112 and 113 will move upwardly in response to the action of the counterweight 134 and outwardly in response to the pneumatic cylinders and pistons 120 and 121; (g) outward relative movement of the bars 112 and 113 will disengage the actuator 126 from the limit switch 128 to permit the switch to reopen and simultaneously permit the clutch to remain de-energized; (h) ascent of the cross sealing bars 112 and 113 will permit disengagement of the member 115 from the lower limit switch 138, thereby opening the circuit to the relay coil 172; (i) opening of the relay coil circuit will permit the contacts 173 and 174 to return to their normally closed position; and, (j) the circuit is now set for operation of the pre-selected timing of the timer motor 167.

Thus, it will be apparent that by simple adjustment of the conventional timer arrangement through an infinitely variable range by means of the elements 167 and 168, and varying the speed of the drive motor 3, that the length of the package may be varied throughout an infinite incremental selection on intermittent application of the transverse or cross seal by the bars 112 and 113. This arrangement permits variation in package or bag size, content capacity and weight, eliminating the necessity for changing web width and its accompanying change of feed spools, insertion of material, adjustment and replacement of apparatus components, etc.

However, the present apparatus also contemplates a simple adjustment, without part removal, for width changes when so desired. In addition, although only one package width is shown for purposes of simplified illustration, it is within the province of this invention to provide multiple feed tubes and longitudinal sealing belts for simultaneously forming a plurality of packages in parallel relationship from opposed webs fed from single spools of extended length. The packages are later separated by conventional slitters (not shown).

Thus, the apparatus of the present invention may include a plurality of components for making any desired number of longitudinal seals of a single width pair of opposed webs. The additional components, such as collars 54—57, guide rollers 32 and 33, sealing means including belts 80 and 81 and their blocks 98, 99, 107 and 108 and additional feed tubes 111 may be conveniently added to the respective supporting shafts in axially spaced relationship.

It will be further apparent that the present invention provides a packaging and bag making apparatus which meets all Government and commercial requirements specifying a dwell period for heat and pressure sealing contact in both the longitudinal seal, by means of inwardly urged heating blocks 98 and 99, and the transverse seal by controlling the pressure and heat period of the coacting cross sealing bars 112 and 113 moving concurrently during this period with the longitudinally moving webs 70 and 71.

I claim:

1. In an apparatus for forming packages, the combination of means for forming a continuous tubular section of heat sealable material, and transporting means for moving said tubular section in a longitudinal path; the combination thereof with improved transverse seal forming means comprising a pair of elongated transverse sealing bars disposed at opposite sides of said tubular section and arranged for alternative coacting relative movement in opposite directions relative to one another and to said section, said pair of transverse sealing bars being further arranged for alternative movement in opposed directions substantially parallel with the longitudinally movable tubular section, heating means for at least one of said bars, bar actuating means, including an electric control circuit that initiates bar movement and a clutch operated drive responsive to the circuit, for imparting said coacting relative movement to said bars for application of transverse pressure and heat sealing to said tubular section concurrently with the said longitudinal movement thereof and to alternatively move the bars in the said opposed directions parallel with the movement of said section, and adjustable control means for said control circuit that periodically triggers the control circuit to initiate the cyclic action of said bars independently of the transporting means for the tubular section of heat sealable material whereby transverse seals are made by intermittent operation of the transverse seal forming means.

2. In an apparatus for forming packages, the combination of means for forming a continuous tubular section of heat sealable material, and transporting means for moving said tubular section in a longitudinal path; the combination thereof with improved transverse seal forming means comprising a pair of elongated transverse sealing bars disposed at opposite sides of said tubular section and arranged for alternative coacting relative movement in opposite directions relative to one another and to said section, said pair of transverse sealing bars being further arranged for alternative movement in opposed directions substantially parallel with the longitudinally movable tubular section, heating means for at least one of said bars, electrically responsive, fluid pressure operated bar actuating means for applying said coacting relative movement to thereby provide a transverse pressure and heat seal to said tubular section concurrently with the said longitudinal movement thereof, an electrically actuated clutch operatively associated with said section moving means and with said sealing bars for actuating said transverse sealing bars in said parallel direction relative to and concurrently with the movement of said section, biasing means for returning said bars to their initial operating position upon interruption of the electrical circuit to said clutch operated drive means, and an electrical circuit including adjustable switch control means and switches for controlling the cyclic alternative action of said bar actuating means and of the circuit to said clutch in the respective movements thereof.

3. The apparatus of claim 2 wherein the clutch is arranged to operate a rack and pinion assembly, the said transverse sealing bars being operatively connected to the rack for movement therewith in the direction of travel of said section, and the electrically actuated clutch having a clutch driving member in operative association with the said transporting means and a releasable clutch element in operable engagement with said pinion, and wherein said biasing means acts to return said bars to their initial operating means through the medium of said rack.

4. In an apparatus for forming packages including means for forming a continuous tubular section of heat sealable material, transporting means for moving said tubular section in a longitudinal path; the combination thereof with improved transverse seal forming means comprising a pair of spaced elongated transverse sealing bars disposed at opposite sides of said tubular section and arranged for reciprocable coacting movement relative to one another and to said section, electric clutch operated drive means operatively associated with said transverse sealing bars and arranged to provide reciprocable movement of said bars in a plane parallel with the plane of movement of said section, fluid pressure actuating means including a fluid pressure source, reciprocating pistons and a control valve for said pistons, said pistons being operatively associated with said transverse sealing bars and arranged to provide reciprocable coacting movement thereof relative to said tubular section, and an electrical control circuit for said fluid pressure actuating means comprising a solenoid for operating said control valve, a timer motor including infinitely adjustable means arranged to control the circuit to said clutch operated drive means and to said solenoid for a selected period of sealing contact and concurrent movement of said transverse sealing bars with said moving section.

5. In a packaging apparatus having means for presenting and transporting a tube of flexible packaging material in a longitudinal path the combination therewith of: a transverse sealing member having a position of reset that is movable from said reset position toward and into engagement with said tube, with said tube through a stroke in a direction longitudinal of the tube, and in a reset motion returning to said reset position; electrically responsive means for moving said sealing member toward said tube and in a resetting motion away from said tube; an electrically operated drive for moving said sealing member through said stroke and permitting a resetting motion for returning to said reset position; an electrical circuit including an initiating switch arranged for actuating said electrically responsive means for moving said sealing member toward said tube, said drive, an initiating switch for said drive arranged for actuating said drive for moving said sealing member through said stroke upon engagement with the tube, adjustable control means arranged to control the operation of said initiating switches, reset switch means actuated in response to movement of said sealing member through a stroke, and reset circuit connections including connections with said reset switch means, said electrically responsive means, and said electrical drive for causing movement of said sealing member to said reset position.

6. In a packaging apparatus having means for presenting and transporting a tube of flexible packaging material in a longitudinal path the combination therewith of: a transverse sealing member having a position of reset that is movable from said reset position toward and into engagement with said tube, with said tube through a stroke in a direction longitudinal of the tube, and in a reset motion returning to said reset position; electrically responsive, fluid pressure operated means for moving said sealing member toward said tube and in a resetting motion away from said tube; an electrically operated drive for moving said sealing member through said stroke and permitting a resetting motion for returning to said reset position; adjustably variable initiating electrical control means including operating means therefor adapted to control the operation of said electrically responsive means and said drive; and a reset circuit for said electrically responsive means and said electrical drive for causing movement of said sealing member to said reset position upon said sealing member traveling through said stroke.

7. In a packaging apparatus having means for presenting and transporting a tube of heat sealable flexible packaging material in a longitudinal path the combination therewith of: a transverse heat sealing member having a position of reset that is movable from said reset position toward and into engagement with said tube, with said tube through a stroke in a direction longitudinal of the tube, and in a reset motion returning to said reset position; variable heat control means associated with said heat sealing member; fluid pressure, electrically responsive means for moving said sealing member toward said tube and in a resetting motion away from said tube; an electrically operated drive for moving said sealing member through said stroke and permitting a resetting motion for returning to said reset position; initiating switch means including operating means therefor that actuates said electrically responsive means for moving said sealing member toward said tube; position sensing switch means actuated by said sealing member when moved against said tube; a circuit for said drive including said position sensing switch means and said drive for moving said sealing member through said stroke upon engagement with the tube; and a reset circuit for said electrically responsive means and said electrical drive for causing movement of said sealing member to said reset position upon said sealing member traveling through said stroke.

8. In a packaging apparatus having means for presenting and transporting a tube of flexible packaging material in a longitudinal path the combination therewith of: a transverse sealing member having a position of reset that is movable from said reset position toward and into engagement with said tube, with said tube through a stroke in a direction longitudinal of the tube, and in a reset motion returning to said reset position; reciprocably operable means for moving said sealing member toward said tube and in a resetting motion away from said tube; a drive for moving said sealing member through said stroke and permitting a resetting motion for returning to said reset position; adjustably variable initiating control means including operating means therefor and adapted to actuate said reciprocably operable means for moving said sealing member toward said tube; position sensing means actuated by said sealing member when moved against said tube, said position sensing means being operatively associated with said drive for moving said sealing member through said stroke upon engagement with the tube; and reset means actuated in response to movement of said sealing member through a stroke and arranged for actuation of said reciprocably operable means, and of said drive for causing movement of said sealing member to said reset position.

9. In a packaging apparatus having means for presenting and transporting a tube of flexible packaging material in a longitudinal path the combination therewith of: a transverse sealing member having a position of reset that is movable from said reset position toward and into engagement with said tube, said tube through a stroke in a direction longitudinal of the tube, and in a reset motion returning to said reset position; electrically responsive, fluid pressure operated means for moving said sealing member toward said tube and in a resetting motion away from said tube; an electrically operated drive comprising a releasable clutch for moving said sealing member through said stroke and permitting, upon release thereof, a resetting motion for returning said sealing member to said reset position; independently operable means for returning said sealing member to reset position upon release of said clutch; initiating switch means adapted to actuate said electrically responsive means for moving said sealing member toward said tube; operating means for said initiating switch means comprising a timing motor including an infinitely adjustable driven member periodically engageable with said initiating switch means at selected initiating intervals; position sensing switch means actuated by said sealing member when moved against said tube; a circuit for said drive including said position sensing switch means and said drive for moving said sealing member through said stroke upon engagement with the tube; reset switch means actuated in response to movement of said sealing member through a stroke; and reset circuit connections including connections with said reset switch means, said electrically responsive means, and said electrical drive for causing movement of said sealing member to said reset position.

10. In a packaging apparatus the combination comprising means for delivering facing webs of heat sealable material in a longitudinal path; a longitudinal heat-sealing section having a pair of leading shafts one on each side of the path of the webs fed by said delivering means, a pair of trailing shafts one on each side of the web path which shafts are to the rear of said leading shafts with respect to the travel of webs fed by said delivering means, a pair of rotors rotatably mounted on each shaft with the rotors of each pair being relatively movable along their shaft to vary the spacing therebetween and to be positioned with each rotor on a leading shaft having a respective rotor on a trailing shaft aligned therewith in the direction of travel of webs fed by said delivering means, a set of four heat-sealing belts each passing around a rotor on a leading shaft and an aligned rotor on a trailing shaft, respective pairs of said heat-sealing belts being arranged in facing relationship, and a pair of heating elements directly behind said sealing belts in heat transmitting relation to webs passed between the sealing belts, a pair of elongated support members one at each side of the web path disposed substantially parallel to the leading and trailing shafts, said heating elements being mounted for relative movement on a respective support member and in alignment with the path of movement of said belts, and a transverse heat-sealing section comprising a transverse heat-sealing member having a position of reset that is movable from said reset position toward and into sealing engagement with said webs, with said web through a stroke in a direction longitudinal of said tube, and in a reset motion returning to said reset position.

11. In a packaging apparatus the combination comprising means for delivering facing webs of heat sealable material in a longitudinal path; a longitudinal heat-sealing section having a pair of leading shafts one on each side of the path of the webs fed by said delivering means, a pair of trailing shafts one on each side of the web path which shafts are to the rear of said leading shafts with respect to the travel of webs by said delivering means, a pair of rotors rotatably mounted on each shaft with the rotors of each pair being relatively movable along their shaft to vary the spacing therebetween and to be positioned with each rotor on a leading shaft having a respective rotor on a trailing shaft aligned therewith in the direction of travel of webs fed by said delivering means, a set of four heat-sealing belts each passing around a rotor on a leading shaft and an aligned rotor on a trailing shaft, respective pairs of said heat-sealing belts being arranged in facing relationship, and a pair of heating elements directly behind said sealing belts in heat transmitting relation to webs passed between the sealing belts, oppositely disposed stationary cross bars, a pair of elongated support members one at each side of the web path, disposed substantially parallel to the leading and trailing shafts and in slidable engagement with said cross bars, said heating elements being mounted for relative movement on a respective support member and in alignment with the path of movement of said belts and a transverse heat-sealing section comprising a transverse heat-sealing member having a position of reset that is movable from said reset position toward and into sealing engagement with said webs, with said web through a stroke in a direction longitudinal of said tube, and in a reset motion returning to said reset position.

12. In a packaging apparatus the combination comprising means for delivering facing webs of heat sealable material in a longitudinal path; a longiutdinal heat-sealing section having a pair of leading shafts one on each side of the path of the webs fed by said delivering means, a pair of trailing shafts one on each side of the web path which shafts are to the rear of said leading shafts with respect to the travel of webs fed by said delivering means, a pair of rotors rotatably mounted on each shaft with the rotors of each pair being relatively movable along their shaft to vary the spacing therebetween and to be positioned with each rotor on a leading shaft having a respective rotor on a trailing shaft aligned therewith in the direction of travel of webs fed by said delivering means, a set of four heat-sealing belts each passing around a rotor on a leading shaft and an aligned rotor on a trailing shaft, respective pairs of said heat-sealing belts being arranged in facing relationship, and a pair of heating elements directly behind said sealing belts in heat transmitting relation to webs passed between the sealing belts, a pair of elongated support members one at each side of the web path disposed substantially parallel to the leading and trailing shafts, said heating elements being mounted for relative movement on a respective support member and in alignment with the path of movement of said belts and a transverse heat-sealing section comprising a transverse heat-sealing member having a position of reset that is movable from said reset position toward and into sealing engagement with said webs, with said web through a stroke in a direction longitudinal of said tube, and in a reset motion returning to said reset position; electrically responsive means for moving said sealing member toward said tube and in a resetting motion away from said tube; an electrically operated drive for moving said sealing member through said stroke and permitting a resetting motion for returning to said reset position; an electrical circuit including an initiating switch arranged for actuating said electrically responsive means for moving said sealing member toward said tube, said drive, an initiating switch for said drive arranged for actuating said drive for moving said sealing member through said stroke upon engagement with the tube, adjustable control means arranged to control the operation of said initiating switches, reset switch means actuated in response to movement of said sealing member through a stroke, and reset circuit connections including connections with said reset switch means, said electrically responsive means, and said electrical drive for causing movement of said sealing member to said reset position.

References Cited in the file of this patent
UNITED STATES PATENTS

| | | |
|---|---|---|
| 2,020,219 | Sirianni | Nov. 5, 1935 |
| 2,103,339 | Salfisberg | Dec. 28, 1937 |
| 2,257,823 | Stokes | Oct. 7, 1941 |
| 2,265,253 | Smith | Dec. 9, 1941 |
| 2,542,901 | Chaffee | Feb. 20, 1951 |
| 2,556,008 | Spalding | June 5, 1951 |
| 2,614,953 | Anglada | Oct. 21, 1952 |
| 2,649,674 | Bartelt | Aug. 25, 1953 |
| 2,680,470 | Stanton | June 8, 1954 |
| 2,680,471 | Mercer | June 8, 1954 |
| 2,698,046 | Finke | Dec. 28, 1954 |
| 2,749,817 | Piazze et al. | June 12, 1956 |
| 2,804,300 | Bilane | Aug. 27, 1957 |
| 2,828,123 | Guillemette | Mar. 25, 1958 |